(12) United States Patent
Emmerich et al.

(10) Patent No.: US 6,370,293 B1
(45) Date of Patent: Apr. 9, 2002

(54) FLEXIBLE OPTICAL CIRCUITS HAVING OPTICAL FIBERS ENCAPSULATED BETWEEN POROUS SUBSTRATES AND METHODS FOR FABRICATING SAME

(75) Inventors: David Michael Emmerich, Dunwoody; Muhammed Afzal Shahid, Snellville, both of GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/397,307

(22) Filed: Sep. 16, 1999

(51) Int. Cl.[7] ............... G02B 6/12; G02B 6/36; G02B 6/44
(52) U.S. Cl. ............... 385/14; 385/80; 385/114; 385/115
(58) Field of Search ............... 385/14, 114, 80, 385/115

(56) References Cited

U.S. PATENT DOCUMENTS

| | | | |
|---|---|---|---|
| 5,155,785 A | 10/1992 | Holland et al. | |
| 5,259,051 A | 11/1993 | Burack et al. | |
| 5,292,390 A | 3/1994 | Burack et al. | |
| 5,394,504 A | 2/1995 | Burack et al. | |
| 5,878,179 A | * 3/1999 | Schricker | 385/114 |

OTHER PUBLICATIONS

W.R. Holland, et al., "Optical Fiber Circuits", *IEEE*, 1993, pp. 711–717, AT&T Bell Laboratories, Princeton, New Jersey.

G.J. Grimes, et al., "Packaging of Optoelectronics and Passive Optics in a High Capacity Tranmission Terminal", *IEEE*, 1993, pp. 718–724, AT&T Bell Laboratories.

* cited by examiner

Primary Examiner—Scott J. Sugarman
(74) Attorney, Agent, or Firm—Alston & Bird LLP

(57) ABSTRACT

A flexible optical circuit includes a plurality of optical fibers mounted to a flexible porous substrate. The optical fibers and flexible porous substrate are thereafter encapsulated with a protective encapsulating material. The encapsulating material can be a liquid which surrounds the optical fibers and flows through pores in the porous substrate to achieve a structurally sound and protected flexible optical circuit. Because the encapsulating material surrounds and protects the optical fibers, heat and pressure are not required in forming the optical circuit, resulting in minimal optical fiber breakage. Additionally, optical fibers may be positioned between two porous substrates, and the fibers and both of the porous substrates then encapsulated by an encapsulating material. A method of constructing the optical circuits includes providing a flexible porous substrate with an upper surface and a lower surface, causing optical fibers to adhere to the upper surface of the flexible porous substrate, and applying an encapsulating material to the optical fibers and the flexible porous substrate to provide strength and protection to the optical circuit. The encapsulating material can be applied to the optical circuit by spray-coating the optical fiber and the flexible porous substrate or by dipping the optical circuit into a bath of encapsulating material.

29 Claims, 3 Drawing Sheets

FLEXIBLE OPTICAL CIRCUITS HAVING OPTICAL FIBERS ENCAPSULATED BETWEEN POROUS SUBSTRATES AND METHODS FOR FABRICATING SAME

FIELD OF THE INVENTION

The present invention relates to optical circuits and, more particularly, to flexible optical circuits having optical fibers encapsulated therein.

BACKGROUND OF THE INVENTION

High capacity electronic systems are increasingly adopting optoelectronics as a means to surpass conventional limitations (e.g., transmission speed) of electrical interconnections. Although photonic technology has long been preferred in long-haul communications, optics is now quickly becoming a viable option for short link applications. One demanding short-link application for optical interconnection is in the interboard/shelf or backplane level of communication. Most large system equipment today is partitioned into bookshelf levels consisting of multiple printed wiring boards inserted into shelves within a frame or cabinet. One interconnect level within such a system is that between two printed circuit boards within the cabinet, known as the backplane level of interconnection.

Backplane systems are typically organized by mounting various system components on printed wiring boards and interconnecting the printed wiring boards with a circuit transmission element known as a backplane. The backplane may include various socket elements for receiving printed wiring boards. However, as the circuit density of printed wiring boards increases, it becomes difficult to provide the needed backplane interconnections because, as interconnection transmission lines become thinner, their impedances increase. Furthermore, electromagnetic interference between closely adjacent electrical signal parts can reduce signal integrity due to cross-talk and interference. Additionally, the distance over which information must be transmitted by backplane conductors is fairly long compared to the distances transmitted on printed wiring boards. These factors may reduce the speed at which the circuits can be operated, and the signal integrity, which may defeat a principal advantage of higher circuit densities. Optical fiber interconnections have been suggested to address these problems.

Recently, convenient and manufacturable methods of linking components at the backplane level via optical fiber interconnections have been suggested which may result in a number of advantages, including down-sized wiring closets, fewer cumbersome cables through management of connections, low loss distribution, and low cost. These optical fiber interconnections are often made of flexible material so that they can be bent for mounting in an appropriate structure to reduce the volume required by the system and to aid in connection to other electronic systems. Although advances in optical fiber interconnections will be discussed with focus on implementation at the backplane level, these interconnections can be utilized in a number of short link applications other than simply those used as backplane connections within a large system cabinet.

U.S. Pat. No. 5,259,051, to Burack et al. (hereinafter Burack et al. '051), assigned to AT&T Bell Laboratories, the predecessor in interest of the assignee of the present invention, is incorporated herein by reference, and describes a method for making optical circuits for use as backplanes by using a robotic routing machine to apply optical fibers to a flat surface of a flexible plastic substrate. Optical fibers are bonded to the substrate surface by a pressure-sensitive adhesive, and after routing they are covered by a plastic sheet that encapsulates the fibers. The sheet is applied using lamination techniques, including the application of pressure and heat directly onto the plastic sheet. The purpose of the encapsulation is to give the structure mechanical stability, to protect the optical fibers from the surrounding environment, and to keep the optical fibers in place during the handling of the optical backplane. The optical fibers of the optical backplane are typically used as large-capacity transmission lines between printed wiring boards or between optical circuits. The optical backplane is preferably designed by a computer, which provides optical fiber routes of the appropriate length between input and output ports of the optical backplane. A robotic routing machine preferably implements these routes because it is important for optical transmission reliability that there not be undesirable deviations in the prescribed length of each line.

While the methods and apparatuses of the Burack et al. '051 patent have been implemented with great success, it has been recognized that optical fibers, which are usually made of glass, are susceptible to damage, particularly at locations at which the fibers overlap or cross over one another. After the optical fibers have been encapsulated in plastic, strain on an optical fiber at a point of overlap or crossover may be sufficient to break or otherwise diminish performance of the optical fiber. The pressure applied to the plastic sheet which encapsulates the optical fibers may also break the optical fibers, especially at points where the optical fibers overlap or criss-cross each other, which is necessary for fiber routing.

U.S. Pat. No. 5,292,390, to Burack et al. (hereinafter Burack et al. '390), incorporated herein by reference, is assigned to AT&T Bell Laboratories, the predecessor in interest of the assignee of the present invention, and also discloses optical fiber encapsulating techniques for producing optical circuits where a plurality of optical fibers are first bonded to an upper surface of a flat flexible plastic substrate and then are covered with a sheet of thermoplastic material to form a composite structure including the thermoplastic material, the optical fibers and the plastic substrate. This composite structure is then compressed at a first elevated temperature and at a first relatively high pressure which are sufficient to bond or tack the thermoplastic material to the plastic substrate. After cooling, a second elevated temperature is applied to the thermoplastic material while compressing the composite structure at a second pressure. The second elevated temperature is higher than the first temperature and is sufficiently high to cause the thermoplastic material to flow about and encase the optical fibers. Although this method of encapsulating fiber can result in less optical fiber breakage and a more reliable laminated structure than Burack et al. '051, the fibers are still susceptible to damage. These problems occur particularly when an extremely dense array of optical fibers including many cross-overs is included on the surface of the flexible plastic substrate. Like Burack et al. '051, the heat and pressure applied to the surface of the thermoplastic material may cause breaks in the optical fibers, especially at cross-over points. Furthermore, if damage from the process is sought to be avoided by using less pressure and lower temperatures, the stability and dependability of the encapsulation may sometimes be compromised.

A third method of encapsulating optical fibers in flexible optical circuits is discussed in U.S. Pat. No. 5,394,504, assigned to AT&T, which is incorporated herein by reference. This patent attempts to alleviate the problems with the previously mentioned patents by using a differential in air pressure, rather than mechanical means, to laminate the flexible optical circuit. Using a vacuum, a thermoplastic sheet is pressed against optical fibers residing on a flat member. The sheet is then heated to cause the thermoplastic sheet to adhere to the flat member, thereby encapsulating the optical fibers. While this application may improve upon earlier techniques of optical fiber encapsulation, there remain several unwanted consequences. For instance, because two solid plastic sheets are laminated together, air can get caught within the plastic sheets, resulting in air pockets. These air pockets may result in the lamination failing and the optical connections faltering. Furthermore, because pressure is applied as in the above examples, albeit from a vacuum, the optical fibers can break during encapsulation, especially at cross-over points. Finally, the use of a vacuum requires additional components may make the lamination process much more complicated and more expensive.

Accordingly, there is a continuing need for methods and apparatuses for encapsulating optical fibers on a flexible plastic substrate which may encase optical fibers, including optical fiber crossovers, with a reduced likelihood of damaging or weakening any of the fibers. Moreover, there is a need for an encapsulation method which is consistent with the requirements of mass production, which does not require great operator skill, which provides long-life structural support and protection to optical fibers, and which maintains predetermined fiber placement.

SUMMARY OF THE INVENTION

According to one embodiment of the invention, a flexible optical circuit having a plurality of optical fibers is provided by mounting optical fibers to a flexible porous substrate and thereafter encapsulating the optical fibers and porous substrate with a protective encapsulating material. The encapsulating material can be a liquid which surrounds the optical fibers and flows through pores in the porous substrate to achieve a structurally sound and protected flexible optical circuit. Because the encapsulating material surrounds and protects the optical fibers, heat and pressure are not required in forming the optical circuit, resulting in reduced optical fiber breakage as compared to prior art methods of constructing flexible optical circuits.

According to one aspect of the invention, an optical circuit includes a first flexible porous substrate having an upper surface and a lower surface, an adhesive located on the upper surface of the first flexible porous substrate, and optical fibers attached to the upper surface of the flexible porous substrate by the adhesive. The flexible optical circuit also includes an encapsulating material applied to the optical fibers. The encapsulating material completely surrounds the optical fibers and impregnates the first flexible porous substrate to provide strength and protection to the optical circuit.

The flexible optical circuit may be fabricated by providing a flexible porous substrate with an upper surface and a lower surface, adhering optical fibers to the upper surface of the flexible porous substrate, and applying an encapsulating material to the optical fibers and the flexible porous substrate to provide strength and protection to the optical circuit. Adhesive can be applied to the upper surface of the flexible porous substrate to cause the optical fiber to adhere to the upper surface of the flexible porous substrate. Furthermore, the flexible porous substrate can comprise a flexible mesh substrate made of kevlar, cotton, plastic, metal, cloth, or other suitable strong and flexible materials. The encapsulating material can be applied to the optical circuit by spray-coating the optical fibers and the flexible porous substrate or by dipping the optical circuit into a bath of encapsulating material. Upon curing, the encapsulating material should be flexible and durable. A suitable encapsulating material may be, for example, plastic.

According to another aspect of the invention, optical fibers are positioned between two porous substrates, and the optical fibers and both of the porous substrates are encapsulated by an encapsulating material. The circuit may be fabricated by providing a first flexible porous substrate with an upper surface and a lower surface, applying adhesive to the upper surface of the first flexible porous substrate or to the optical fibers to cause optical fibers to adhere to the upper surface of the first flexible porous substrate, placing the optical fibers on the upper surface of the first flexible porous substrate, placing a second flexible porous substrate on the optical fibers, located opposite the first flexible porous substrate, and applying an encapsulating material to the optical fibers, the first flexible porous substrate, and the second flexible porous substrate to provide strength and protection to the optical circuit.

Additionally, an adhesive may be applied to a surface of the second flexible porous substrate that is in contact with the optical fibers to fix the second flexible porous substrate relative to the optical fibers. The encapsulating material may be applied to the first and second flexible porous substrates by spray-coating or bath emersion so that the encapsulating material flows through pores in the second flexible porous substrate and pores in the first flexible porous substrate to fill any gaps therebetween, and to substantially surround the optical fibers therebetween. As in the previous described embodiments, the use of porous substrates and encapsulating material provide protection to the optical circuit without the need for lamination or the requirement of pressure. Therefore, optical fiber breakage and optical circuit delamination can be minimized.

Other features and advantages of the present invention will become apparent to one skilled in the art upon examination of the following drawings and detailed description. It is intended that all such features and advantages be included herein within the scope of the present invention as defined by the appended claims.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

First, a conventional flexible optical circuit of the prior art, wherein optical fibers are encapsulated by laminated substrates, will be described. Next, flexible optical circuits of the present invention, utilizing one or more porous substrates and an encapsulating material to overcome disadvantages of the prior art, such as optical fiber breakage and optical circuit delamination, will be described.

Conventional Flexible Optical Circuits

Figure 1A:
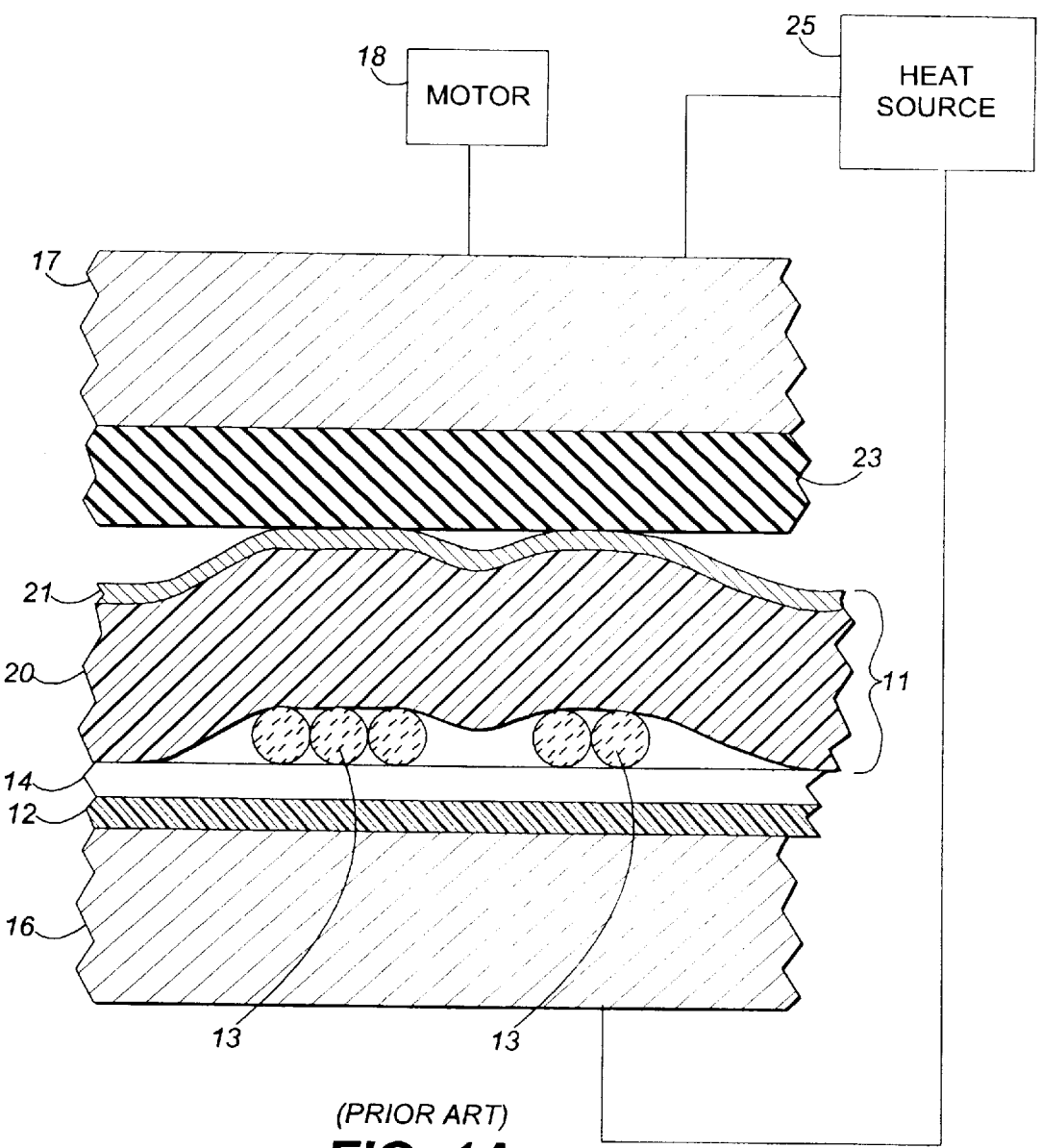
FIG. 1A shows a cross-sectional view of a conventional flexible optical circuit during formation.

FIG. 1A shows a cross-sectional view of a conventional flexible optical circuit of the prior art during formation. An optical circuit 11 comprises a flexible plastic substrate 12 to which a plurality of optical fibers 13 are adhered by an adhesive layer 14. As described in the aforementioned Burack et al. patent, '051, the fibers 13 may be located on the substrate surface by a computer-controlled routing machine, and the adhesive 14 may be a pressure-sensitive adhesive. After the fibers have been routed onto the substrate, it is necessary to encapsulate them to provide structural support for the fibers and to protect them from the environment and from the effects of handling. To encapsulate the optical fibers, the optical circuit 11 is placed on a lower platen 16 of a press machine which includes an upper platen 17 actuated by a motor 18. Over the optical fibers and the plastic substrate is placed a layer 20 of thermoplastic material, and over the layer of thermoplastic material is placed a second substrate 21 of plastic material that is preferably of the same material as plastic substrate 12. A layer 23 of a resilient or spongy thermally conductive material is located between the upper plastic substrate 21 and the upper platen 17. The purpose of the layer 23 is to transmit heat from platen 17 and to distribute stresses over the optical backplane structure so as to avoid concentrations of stress that might damage optical fibers. The composite structure comprising plastic substrates 12 and 21, thermoplastic layer 20 and optical fibers 13 is then heated by a heat source 25 to bond the two plastic substrates 12 and 21.

Figure 1B:
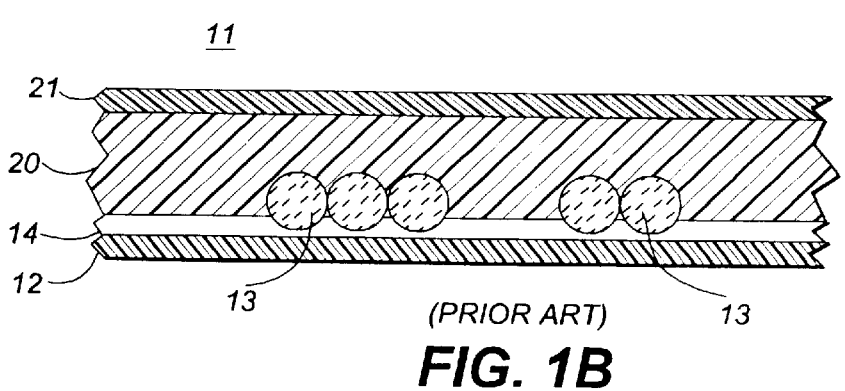
FIG. 1B shows a cross-sectional view of the conventional flexible optical circuit of FIG. 1A after formation is complete.

FIG. 1B shows the conventional flexible optical circuit 11 of FIG. 1A after formation is complete. Ideally, as shown in FIG. 1B, using the conventional construction technique described above, the optical fibers 13 are encapsulated within the flexible plastic substrates 12, 21 without suffering damage as the plastic substrates 12, 21 are securely laminated together. However, this conventional technique, as described in U.S. Pat. No. 5,292,390 to Burack et al., may result in some negative consequences. For example, because pressure and heat are applied to the upper plastic substrate 21 to encapsulate the optical fibers 13, the optical fibers 13 may break, or coating of the optical fibers 13 may be damaged, usually at cross-over points, thereby degrading optical circuit performance. This is due to the optical fibers 13 being constructed of glass or plastic which cannot withstand the pressure and heat of lamination, particularly at locations where the optical fibers cross-over. Furthermore, the lamination process may result in trapped air located between the first plastic substrate 12 and second plastic substrate 21. The trapped air can expand and shrink, causing the lamination to fail, resulting in plastic layer separation, especially when the optical circuit 11 is placed in an environment having extremely low or high temperatures or large temperature fluctuations. The separation of the plastic substrates 12, 21 can result in free movement of the optical fibers 13, increasing the likelihood of optical fiber 13 breakage, or displacement of the optical fibers 13 at a portion of the optical circuit 11 where connections to the optical fibers 13 are made. These consequences, as will be appreciated by those of skill in the art, can result in poor performance of the optical circuit 11.

Flexible Optical Circuit of the Present Invention

The present invention overcomes many of the negative aspects of prior art flexible optical circuits by mounting optical fibers to a flexible porous substrate and thereafter encapsulating the optical fibers and porous substrate with a protective encapsulating material. The encapsulating material can be a liquid which surrounds the optical fibers and flows through pores in the porous substrate to achieve a structurally sound and protected flexible optical circuit. According to another aspect of the invention, optical fibers may be positioned between two porous substrates, where the fibers and both the porous substrates are encapsulated by an encapsulating material. The encapsulating material functions to surround and protect the optical fibers, and obviates the need for heat and pressure in forming the optical circuit, resulting in reduced optical fiber damage and breakage as compared to prior art methods of constructing flexible optical circuits.

Figure 2A:
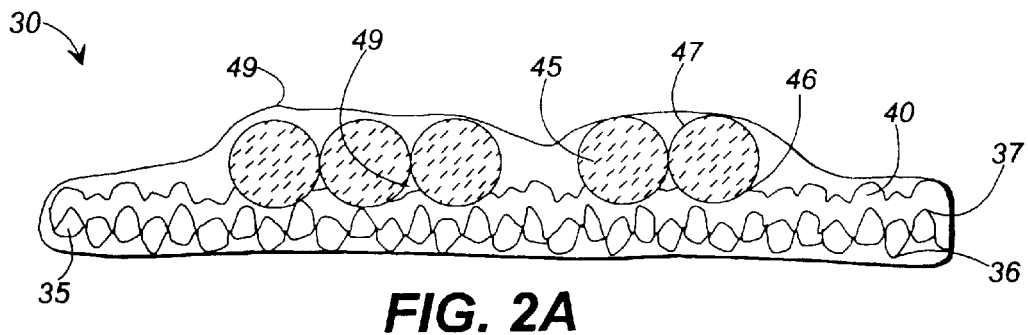
FIG. 2A shows a cross-sectional view of a flexible optical circuit in accordance with an embodiment of the present invention.

FIG. 2A shows a cross-sectional view of a flexible optical circuit in accordance with an embodiment of the invention. The flexible optical circuit 30 comprises a flexible porous substrate 35, having a lower surface 36 and an upper surface 37. A function of the flexible porous substrate 35 is to act as a base structure upon which the remainder of the optical circuit 30 may be formed. As will be appreciated by those of skill in the art, a wide variety of flexible porous substrates having sufficient structural rigidity to act as a base of the optical circuit 30 may be utilized in the present invention. In the embodiment of FIG. 2A, the flexible porous substrate 35 is shown to be a flexible mesh. The mesh may comprise material made of cloth, kevlar (such as KEVLAR, a registered trademark of E. I. du Pont de Nemours and Company), plastic, cotton, metal, or any other suitable flexible porous material which may support other elements, as described below, of the optical circuit 30.

An adhesive 40 is applied to the upper surface 37 of the flexible porous substrate 35. The adhesive 40 is preferably a relatively strong adhesive, which provides tackiness to cause a lower portion 46 of at least one of a plurality of optical fibers 45 to adhere to the upper surface 37 of the flexible porous substrate 35. The optical fibers 45 should adhere to the flexible porous substrate 35 so that the optical fibers 45 do not move during or subsequent to the formation of the optical circuit 30. If the optical fibers 45 move during formation of the optical circuit 30, then the optical fibers 45 may be out of place at an end portion (not shown) of the optical circuit 30 where the optical fibers 45 should be precisely aligned for connection to external components.

Figure 2B:
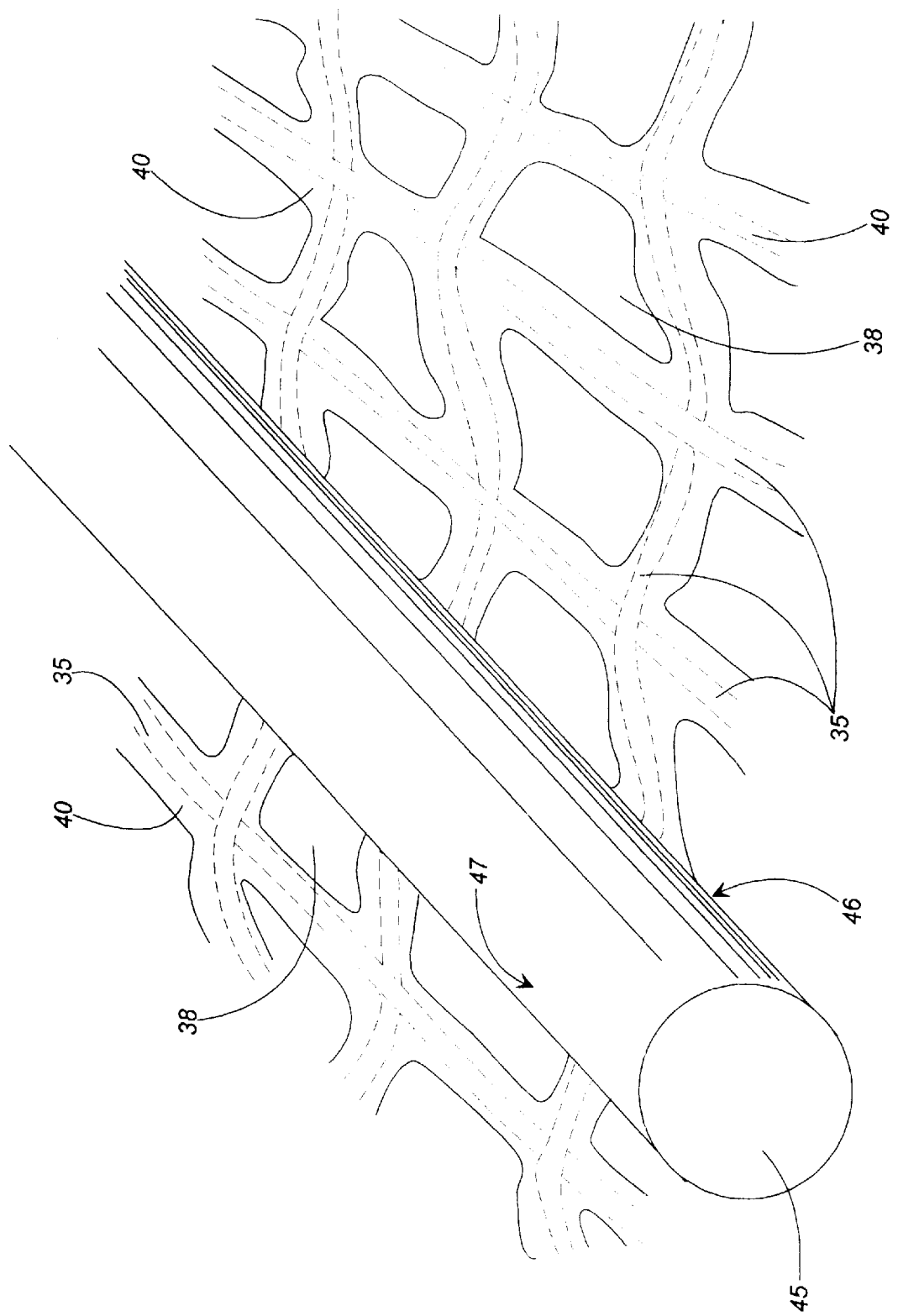
FIG. 2B shows a partial perspective view of the flexible optical circuit of FIG. 2A including one optical fiber, prior to application of an encapsulating material in accordance with an embodiment of the present invention.

The adhesive 40 may be applied using conventional techniques well known in the art. As is illustrated in FIG. 2B, the adhesive 40 is preferably applied to the flexible porous substrate 35 in a manner which does not fill in pores 38 of the flexible porous substrate 35. In FIG. 2B, the flexible porous substrate 35 is a flexible mesh illustrated with phantom lines, due to the upper surface of the mesh being covered with adhesive 40. Although FIG. 2B shows the mesh to comprise extremely thin filaments, it will be appreciated by those of skill in the art that the types and sizes of mesh or porous substrates 35 that may be utilized may vary. The adhesive 40 coats only each individual filament of the mesh, rather than the mesh in its entirety. As a result, the mesh remains porous, although the area of the pores 38 may be diminished due to coating of the material which makes up the porous mesh. Alternatively, the adhesive 40 may be applied directly to the optical fibers 45 as the optical fibers 45 are being deposited on the porous substrate 35. The adhesive 40 may be a conventional adhesive, such as a silicone adhesive, an acrylic adhesive, a rubber based adhesive, a pressure sensitive adhesive, combinations thereof, or other suitable adhesives well known to those of skill in the art. Additionally, the adhesive can be flame retardant, so as not to act as a fuse if one end of the optical circuit 30 catches on fire.

The optical fibers 45 adhered to the upper surface 37 of the flexible porous substrate 35 can include a number of different optical fiber types, although a conventional dual acrylic coated glass fiber having a total outside diameter of either two hundred fifty or one hundred twenty five microns is preferred. Although the optical fibers 45 may be placed on the upper surface 37 of the flexible porous substrate 35 by a human operator, the optical fibers 45 are preferably placed onto the flexible porous substrate 35 by a mechanical routing machine. One such machine is disclosed in U.S. Pat. No. 5,259,051, to Burack et al. Such a routing machine enables optical circuits 30 to be mass produced and can reduce the operator skill required for optical circuit fabrication. Furthermore, the routing machine can accurately align optical fibers 45 of the optical circuit 30 so that a precise length of an optical fiber is used for a given path, which may be important in some high speed digital systems where deviations in optical fiber length can result in timing and synchronization errors. It should be realized, however, that any such machine must be able to route optical fibers 45 that are relatively fragile and less flexible than conventional electrical conductors, such as electrical wire. Because the flexible porous substrate 35 is flexible, the substrate 35 may either be temporarily mounted on a carrier board (e.g., by a light adhesive or other securing means), or may be stretched so as to be taut, thereby allowing optical fiber 45 placement thereon.

After the optical fibers 45 are adhered to the upper surface 37 of the flexible porous substrate 35 by adhesive 40, an encapsulating material 49 is applied to the optical fibers 45 and the flexible porous substrate to provide strength and protection to the optical circuit 30. Upon application, the encapsulating material 49 can completely surround the optical fibers 45, including an upper portion 47 of the optical fibers 45, as well as the flexible porous substrate 35, as shown in FIG. 2A (note that the encapsulating material 49 is not illustrated in FIG. 2B). Because the flexible porous substrate 35 contains pores 38, the encapsulating material 49 may impregnate the flexible porous substrate 35. After application, the encapsulating material may then cure. The function of the encapsulating material 49 is to ensure that no unfilled gaps exist between adjacent optical fibers 45, or between the optical fibers 45 and the flexible porous substrate 35, and to strengthen the flexible porous substrate 35 and to bond the flexible porous substrate 35 and the optical fibers 45.

In contrast to the prior art, where a plastic substrate is placed over the optical fibers and laminated using heat and pressure to another substrate located underneath the optical fibers, the encapsulating material 49 of the present invention conforms to the shapes of the optical fibers 45. The encapsulating material 49 may be in a liquid form so that the encapsulating material 49 can fill any gaps. The encapsulating material 49 can be silicone, silicone rubber, polyvinyl chloride (pvc), polyurethane, epoxy, or another suitable material known to those of skill in the art which is flexible, is durable, is inexpensive, can encapsulate the optical fibers 45 and flexible porous substrate 35, protects the circuit from external environments, and provides sufficient structural rigidity. Furthermore, the encapsulating material 49 should be of proper viscosity so that when applied to the optical fibers 45 and flexible porous substrate 35, the encapsulating material 49 penetrates the pores 38 and adhere to the optical fibers 45 and flexible porous substrate 35. To encourage this adhesion, the flexible porous substrate 35 should have adequate coarseness on at least one portion, such as the lower surface 36, so as to allow the encapsulating material 49 to adhere to the substrate 35.

The encapsulating material 49 may be applied utilizing a number of techniques. For example, the encapsulating material 49 can be sprayed onto the optical fibers using conventional spray-coating techniques. According to another embodiment of the invention, the optical circuit 30 can be dipped into a bath of the encapsulating material 49. If the optical circuit 30 is dipped into encapsulating material 49, the optical circuit 30 may undergo a step, such as hanging, to allow excess encapsulating material to be removed. An advantage of each of these methods over the prior art is that no pressure need be applied to the optical fibers 45. As a result, the present invention can provide a flexible optical circuit 30 with less likelihood of optical fiber damage than prior art techniques. Furthermore, because no lamination is used, the process of creating optical circuits is simplified.

Figure 3:
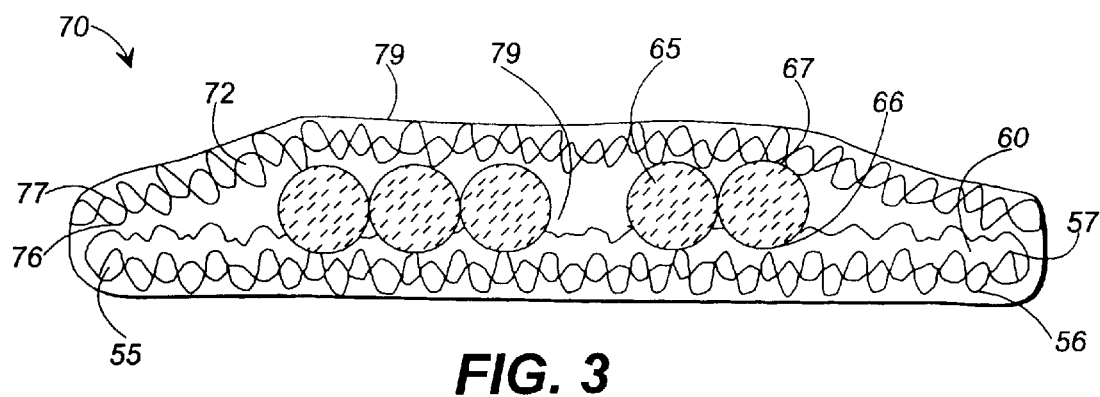
FIG. 3 shows a cross-sectional view of a flexible optical circuit in accordance with a second embodiment of the present invention.

FIG. 3 shows a cross-sectional view of a flexible optical circuit 70 in accordance with a second embodiment of the invention. It will be appreciated by those of skill in the art that like elements in the embodiments shown in FIG. 2A and FIG. 3 perform substantially the same functions and may be made of like materials and constructed in like techniques. As in the embodiment of FIG. 2A, the flexible optical circuit 70 comprises a first flexible porous substrate 55, having a lower surface 56 and an upper surface 57, an adhesive 60 applied to the upper surface 57 of the first flexible porous substrate 55, and optical fibers 65 fixed to the first flexible porous substrate 55 at a lower portion 66. Unlike the embodiment described in FIG. 2A, however, there exists a second flexible porous substrate 72 which covers an upper portion 67 of the optical fibers 65.

After the optical fibers 65 are adhered to the upper surface 57 of the first flexible porous substrate 55, but prior to the application of an encapsulating material 79, the second flexible porous substrate 72, having a lower surface 76 and an upper surface 77, is placed over the optical fibers 65 so as to sandwich the optical fibers 65 between the first and second flexible porous substrates 55, 72. The second flexible porous substrate 72 functions to provide additional support to the optical circuit 70, and may be constructed of similar materials used to construct the first flexible porous substrate 55, including the same material. In the embodiment of FIG.

3, both the first flexible porous substrate 55 and the second flexible porous substrate 72 are shown to be flexible mesh, which may comprise mesh cloth, kevlar, plastic, cotton, metal, or any other flexible porous material providing support to the optical circuit 70.

After the second flexible porous substrate 72 is applied to the upper portion 67 of the optical fibers 65, an encapsulating material 79 is applied to the optical circuit 70. As in the embodiment described in FIG. 2A, the encapsulating material 79 can be sprayed onto the optical fibers using conventional spray-coating techniques, or the optical circuit 70 can be dipped into the encapsulating material 79. If the encapsulating material 79 is spray-coated, it is preferred that the encapsulating material 79 be of proper viscosity so that it penetrates the pores in the first and second flexible porous substrates 55, 72 to fill any gaps located between the first flexible porous substrate 55 and the second flexible porous substrate 72. Moreover, to ensure that the entire optical circuit is fully encapsulated with encapsulating material 79, the optical circuit 70 may be flipped over for application of encapsulating material 79 onto the first flexible porous substrate 55 during the spray-coating process to ensure proper saturation of encapsulating material through pores in both the first flexible porous substrate 55 and pores in the second flexible porous substrate 72.

The use of the second flexible porous substrate 72 provides the optical circuit 70 with additional strength over the optical circuit 30 embodied in FIG. 2A, although the additional materials will most likely result in relatively higher costs. However, unlike the prior art, but like the embodiment of FIG. 2A, no pressure is applied to the optical fibers during construction of the optical circuit 70. As a result, the present invention can provide a strong, flexible optical circuit 70 with less likelihood of optical fiber damage than prior art techniques. Furthermore, expensive lamination processes are not required for the optical circuit 70 construction.

Figure 4:
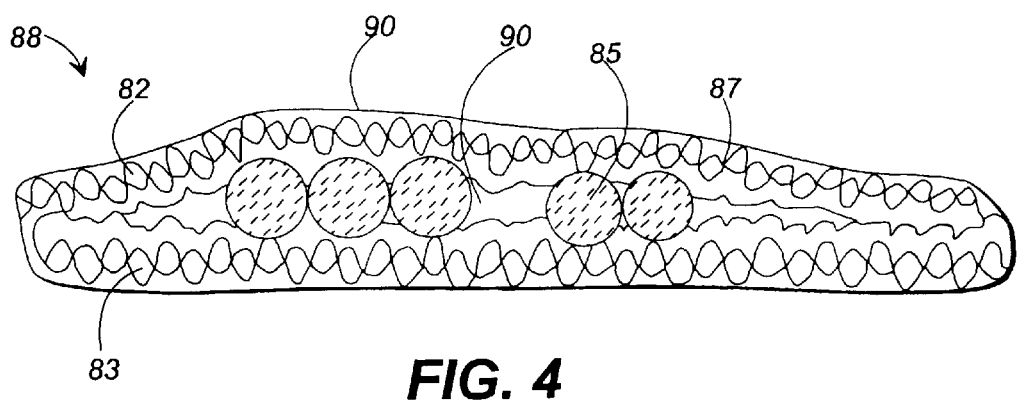
FIG. 4 shows a cross-sectional view of a flexible optical circuit in accordance with a third embodiment of the present invention.

FIG. 4 a cross-sectional view of a flexible optical circuit 88 in accordance with a third embodiment of the invention. It will be appreciated by those of skill in the art that like elements in the embodiments shown in FIGS. 2A, 3 and 4 perform substantially the same functions and may be like materials and constructed in like techniques. The optical circuit 88 of the embodiment shown in FIG. 4 is substantially identical in structure and construction to the optical circuit 70 embodiment of FIG. 4 except for the addition of an adhesive layer 87 located between the second flexible porous substrate 82 and the optical fibers 85. This adhesive layer can be applied to the second flexible porous substrate 82 prior to the placement of the substrate 82 on the optical fibers 85, in the same manner the adhesive 40 is applied to the flexible porous substrate 35, as described above with respect to FIG. 2A. The function of the adhesive 87 is to fix the optical fibers 85 in place with respect to the second flexible porous substrate 82 prior to the addition of encapsulating material 90, which secures optical circuit 88 elements relative to one another. Like the adhesive 40 applied to the flexible porous substrate 35, the adhesive layer 87 should leave pores open so that the encapsulating material 90 can penetrate the porous substrates 82, 83 to fill gaps in the optical circuit 88. Like the other embodiments of the present invention, this embodiment produces a strong optical circuit 88 without the use of heat and pressure during formation of the optical circuit 88, resulting in reduced optical fiber 85 breakage as compared to prior art methods of constructing optical circuits.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for encapsulating a plurality of optical fibers to form an optical circuit, comprising:

providing a flexible porous substrate with an upper surface and a lower surface;

adhering an optical fiber of the plurality of optical fibers to the upper surface of the flexible porous substrate, and applying an encapsulating material to the optical fiber and the flexible porous substrate to provide strength and protection to the optical circuit.

2. The method of claim 1, wherein adhering the optical fiber to the flexible porous substrate comprises applying an adhesive to the upper surface of the flexible porous substrate to cause the optical fiber to adhere to the upper surface of the flexible porous substrate.

3. The method of claim 1, wherein providing a flexible porous substrate comprises providing a flexible mesh substrate.

4. The method of claim 1, wherein applying an encapsulating material comprises spray-coating the optical fiber and the flexible porous substrate with the encapsulating material.

5. The method of claim 4, wherein spray-coating the optical fiber and the flexible porous substrate with an encapsulating material comprises spray-coating the optical fiber and the flexible porous substrate with a plastic encapsulating material.

6. The method of claim 1, wherein applying an encapsulating material comprises dipping the flexible porous substrate with the optical fiber adhered thereto in a bath of encapsulating material.

7. A method for encapsulating a plurality of optical fibers to form an optical circuit, comprising:

providing a first flexible porous substrate with an upper surface and a lower surface;

applying adhesive to the upper surface of the first flexible porous substrate;

placing an optical fiber of a plurality of optical fibers on the upper surface of the first flexible porous substrate;

covering the optical fiber with a second flexible porous substrate located opposite the first flexible porous substrate; and applying an encapsulating material to the optical fiber, the first flexible porous substrate, and the second flexible porous substrate.

8. The method of claim 7, wherein the second flexible porous substrate includes an upper surface and a lower surface, and further comprising applying adhesive to the lower surface of the second flexible porous substrate and wherein the step of covering comprises covering the optical fiber with the second flexible porous substrate.

9. The method of claim 7, wherein applying an encapsulating material comprises spray-coating the second flexible porous substrate with the encapsulating material so that the encapsulating material flows through the second flexible porous substrate and the first flexible porous substrate to fill any gaps therebetween.

10. The method of claim 7, wherein applying an encapsulating material comprises dipping the first flexible porous substrate, the second flexible porous substrate, and the fiber disposed therebetween in a bath of encapsulating material.

11. The method of claim 7, wherein providing a first flexible porous substrate comprises providing a first flexible mesh substrate, and wherein covering the optical fiber with the second flexible porous substrate comprises covering the optical fiber with a second flexible mesh substrate.

12. The method of claim 11, wherein applying an encapsulating material comprises applying a plastic encapsulating material to the first flexible mesh substrate, optical fiber, and second flexible mesh substrate.

13. A flexible optical circuit having a plurality of optical fibers, comprising:
    a first flexible porous substrate having an upper surface and a lower surface;
    an optical fiber of the plurality of optical fibers attached to the upper surface of the first flexible porous substrate by an adhesive; and
    an encapsulating material surrounding the optical fiber and impregnating the first flexible porous substrate.

14. The flexible optical circuit of claim 13, wherein the first flexible porous substrate is chosen from a group consisting of a metal mesh, a kevlar mesh, a plastic mesh, and a cloth mesh.

15. The flexible optical circuit of claim 13, further comprising:
    a second flexible porous substrate covering the optical fiber and opposite the first flexible porous substrate, thereby sandwiching the optical fiber between the first flexible porous substrate and the second flexible porous substrate.

16. The flexible optical circuit of claim 15, wherein an encapsulating material surrounds the optical fiber and impregnates the first flexible porous substrate and second flexible porous substrate.

17. The flexible optical circuit of claim 15, further comprising an adhesive located adjacent to the second flexible porous substrate and between the second flexible porous substrate and the optical fiber.

18. The flexible optical circuit of claim 15, wherein the encapsulating material fills substantially all gaps located in between the first flexible porous substrate and the second flexible porous substrate.

19. The flexible optical circuit of claim 15, wherein the first flexible porous substrate and the second flexible porous substrate are chosen from a group consisting of a metal mesh, a kevlar mesh, a plastic mesh, and a cloth mesh.

20. A flexible optical circuit, comprising:
    a first flexible substrate having two opposing sides;
    an optical fiber in contact with at least one of the two opposing sides; and
    an encapsulating material surrounding the optical fiber and impregnating the first flexible substrate.

21. The flexible optical circuit of claim 20, wherein the first flexible substrate is chosen from a group consisting of a metal mesh, a kevlar mesh, a plastic mesh, and a cloth mesh.

22. The flexible optical circuit of claim 20, further comprising:
    a second substrate covering the optical fiber and opposite the first flexible substrate, thereby sandwiching the optical fiber between the first flexible substrate and the second substrate.

23. The flexible optical circuit of claim 22, wherein an encapsulating material surrounds the optical fiber and impregnates the first flexible substrate and second substrate.

24. The flexible optical circuit of claim 23, further comprising an adhesive located adjacent to the second flexible substrate and between the second substrate and the optical fiber.

25. A method of forming an optical circuit, comprising:
    providing a substrate with an upper surface and a lower surface;
    adhering an optical fiber of the plurality of optical fibers to the upper surface of the substrate, and
    applying an encapsulating material to the optical fiber and the substrate to provide strength and protection to the optical circuit.

26. The method of claim 25, wherein adhering the optical fiber to the substrate comprises applying an adhesive to the upper surface of the substrate to cause the optical fiber to adhere to the upper surface of the substrate.

27. The method of claim 25, wherein providing a substrate comprises providing a flexible substrate.

28. The method of claim 25, wherein applying an encapsulating material comprises spray-coating the optical fiber and the substrate with the encapsulating material.

29. The method of claim 25, wherein spray-coating the optical fiber and the substrate with an encapsulating material comprises spray-coating the optical fiber and the substrate with a plastic encapsulating material.

* * * * *

UNITED STATES PATENT AND TRADEMARK OFFICE
CERTIFICATE OF CORRECTION

PATENT NO. : 6,370,293 B1
DATED : April 9, 2002
INVENTOR(S) : Emmerich et al.

It is certified that error appears in the above-identified patent and that said Letters Patent is hereby corrected as shown below:

Title page,
Item [56], References Cited, OTHER PUBLICATIONS, "Tranmission" should read -- Transmission --.

Column 12,
Line 21, "claim 23" should read -- claim 22 --;
Line 43, "claim 25" should read -- claim 28 --.

Signed and Sealed this

Twenty-fifth Day of June, 2002

Attest:

Attesting Officer

JAMES E. ROGAN
Director of the United States Patent and Trademark Office